(12) United States Patent
Mollard et al.

(10) Patent No.: US 11,914,214 B2
(45) Date of Patent: Feb. 27, 2024

(54) REFLECTIVE DEVICE

(71) Applicant: COMMISSARIAT A L'ENERGIE ATOMIQUE ET AUX ENERGIES ALTERNATIVES, Paris (FR)

(72) Inventors: Laurent Mollard, Grenoble (FR); Christel Dieppedale, Grenoble (FR); Laurent Frey, Grenoble (FR); Francois Gardien, Grenoble (FR); Jean Hue, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 543 days.

(21) Appl. No.: 16/848,896

(22) Filed: Apr. 15, 2020

(65) Prior Publication Data
US 2020/0333547 A1  Oct. 22, 2020

(30) Foreign Application Priority Data

Apr. 18, 2019 (FR) ...................................... 19 04137

(51) Int. Cl.
*G02B 7/00* (2021.01)
*G01S 7/481* (2006.01)
(Continued)

(52) U.S. Cl.
CPC ............ *G02B 7/008* (2013.01); *G01S 7/4817* (2013.01); *G02B 5/003* (2013.01); *G02B 5/0205* (2013.01);
(Continued)

(58) Field of Classification Search
CPC ...... G02B 5/0205; G02B 7/008; G02B 5/003; G02B 5/0226; G02B 26/0833; G02B 5/02;
(Continued)

(56) References Cited

U.S. PATENT DOCUMENTS 4,415,234 A    11/1983  Meyers
4,656,641 A *   4/1987  Scifres .................. H01S 5/4062
                                                      372/101
(Continued)

FOREIGN PATENT DOCUMENTS

CN    103672622 A  *  3/2014
JP    H07104203 B2 * 11/1995
(Continued)

OTHER PUBLICATIONS

French Preliminary Search Report dated Jan. 10, 2020 in French Application 19 04137 filed on Apr. 18, 2019 (with English Translation of Categories of Cited Documents), 2 pages.
(Continued)

*Primary Examiner* — Hoan C Nguyen
(74) *Attorney, Agent, or Firm* — Oblon, McClelland, Maier & Neustadt, L.L.P.

(57) ABSTRACT

A reflector device reflects luminous radiation of wavelength λ. The device is provided with a supporting base whereon are assembled a partially transparent mirror having a partially reflective front face and luminous radiation scattering and/or absorption structure to scatter and/or absorb luminous radiation liable to be transmitted by a rear face, opposite the front face.

17 Claims, 6 Drawing Sheets

(51) Int. Cl.
*G02B 5/02* (2006.01)
*G02B 26/08* (2006.01)
*G02B 5/00* (2006.01)

(52) U.S. Cl.
CPC ....... *G02B 5/0226* (2013.01); *G02B 26/0833* (2013.01)

(58) Field of Classification Search
CPC ..... G02B 6/004; G02B 6/0016; G01S 7/4817; G02F 2203/03; G02F 2203/05; G02F 1/0155; G02F 1/0156; G02F 2201/346; G02F 2201/307; G01N 1/405; G01N 2021/1744; G12B 1/02; G21C 3/348; G21C 3/352; G03D 5/062; G05D 1/0244; G01K 1/24; F21V 14/00; G01D 5/35316; H01S 5/141; H01S 5/4087; H01S 5/0687; H01S 5/22; H01S 3/005; H01S 5/4025; H01S 3/0941; H01S 5/125; H01S 3/10; H01S 5/227; H01S 3/2391; H01S 5/187; H01S 5/0085; H01S 5/0622; H01S 3/101; H01S 5/42; H01S 5/00; H01S 5/32308; H01S 5/3235
See application file for complete search history.

(56) References Cited

U.S. PATENT DOCUMENTS

| | | | | |
|---|---|---|---|---|
| 5,157,548 | A * | 10/1992 | Monnier | G02B 23/125 359/419 |
| 5,621,227 | A * | 4/1997 | Joshi | H01L 27/1446 257/190 |
| 6,101,749 | A * | 8/2000 | Inbar | G02B 27/024 40/448 |
| 6,321,008 | B1 * | 11/2001 | Riant | G02B 6/02085 385/37 |
| 2006/0033980 | A1 | 2/2006 | Wagner et al. | |
| 2016/0084945 | A1 * | 3/2016 | Rodrigo | G01S 7/4917 356/5.01 |
| 2017/0212222 | A1 * | 7/2017 | Leduc | G01S 17/42 |
| 2018/0128452 | A1 * | 5/2018 | Adema | G02B 27/141 |

FOREIGN PATENT DOCUMENTS

| | | | | |
|---|---|---|---|---|
| JP | 2000164982 A | * | 6/2000 | |
| JP | 2005-337715 A | | 12/2005 | |
| WO | WO-2010066110 A1 | * | 6/2010 | G02B 17/0615 |

OTHER PUBLICATIONS

Schenk et al., "Micro Mirrors for high-speed Laser Deflection and Patterning", Physics Procedia, 56, 2014, 13 pages.
U.S. Appl. No. 16/445,290, filed Jun. 19, 2019, 2020/0013852 A1, Le Rhun, G, et al.
U.S. Appl. No. 16/732,767, filed Jan. 2, 2020, Frey, L, et al.

* cited by examiner

REFLECTIVE DEVICE

TECHNICAL FIELD

The invention relates to a reflector device, and particularly a reflector device subject to little or no overheating in operation. In this regard, the reflector device comprises a partially transparent mirror and at the rear whereof thermal scattering and/or absorption means are disposed.

STATE OF THE RELATED ART

Micromirrors are currently widely present in the field of MEMS and in particular in LIDAR ("Light Detection And Ranging systems") type devices.

The latter make it possible particularly to scan a surface or a target with luminous radiation for detection or imaging purposes.

In this regard, in these LIDAR type devices, the micromirrors are arranged to oscillate along one or two pivot axis/axes, at a predetermined beat frequency, so as to reflect incident radiation in different directions.

The beat frequency of the micromirrors may vary from a few Hz to several kHz, and the size thereof may be of the order of a few millimeters (for example a few millimeters in diameter for disk-shaped micromirrors), and may particularly be between 1 mm and 3 mm.

According to an example known from the prior art, a micromirror may comprise a metallic reflective layer formed on a main face of a supporting base, for example a supporting base made of silicon, and particularly of monocrystalline silicon.

The metallic reflective layer may in particular comprise a layer of gold or of aluminum of a thickness between 50 nm and 500 nm.

However, this configuration is not satisfactory.

Indeed, the metallic reflective layer has a non-negligible luminous radiation absorption coefficient such that, in operation, particularly when the power of the incident radiation is high, overheating of the micromirror is observed.

This effect may occur when the luminous radiation is in the infrared range and particularly of wavelength $\lambda=1550$ nm.

By way of example, at this wavelength, a micromirror comprising a reflective metallic layer having a reflection coefficient of 96% and an absorption coefficient of 4% may be subjected to a sufficient temperature rise to result in the thermomechanical destruction of the mirror Also, and under equivalent conditions, a micromirror comprising a reflective metallic layer having a reflection coefficient of 98% and an absorption coefficient of the order of 2% may be subjected to "theoretical" overheating to a temperature close to 2000° C. after around one hundred seconds However, such overheating damages micromirrors.

In order to remedy this problem, it has been considered to replace the metallic reflective layer by a Bragg reflector stack as described in the document [1] cited at the end of the description, in order to increase the laser damage threshold of these optical components.

Such a Bragg reflector stack generally comprises a plurality of elementary reflector stacks arranged to reflect radiation of a predetermined wavelength referred to as Bragg length. By way of example, a Bragg stack, intended to operate at the Bragg length equal to 1550 nm, may comprise a layer of amorphous silicon of 110 nm of thickness and a layer of silicon dioxide of 305 nm of thickness.

The Bragg reflector stack exhibits little or no absorption such that no overheating of the micromirror is observed.

However, this configuration is likewise not satisfactory.

Indeed, in order to maximize the reflection coefficient of the Bragg reflector stack, the latter generally comprises a large number of elementary reflector stacks which may be the source of deformations due to the mechanical strain applied by the multiplication of the layers. The multiplication of the elementary stacks also complicates the method for manufacturing such a reflector.

Considering a reduced number of elementary reflector stacks affects the reflection coefficient of the micromirror. In particular, the latter, which is partially transparent, transmits a portion of the luminous radiation.

An aim of the present invention is therefore that of providing an optical device provided with a micromirror suitable for operating at higher incident radiation powers than conventional metallic mirrors, i.e. with a higher laser damage threshold both in the short term and in the long term.

A further aim of the present invention is also that of providing an optical device provided with a micromirror and arranged to limit the deformations of said mirror.

DESCRIPTION OF THE INVENTION

The aims of the present invention are, at least in part, achieved by a reflector device intended to reflect luminous radiation of wavelength advantageously greater than 1250 nm, particularly equal to 1550 nm, the device is provided with a supporting base whereon are assembled:
  a partially transparent mirror, having a partially reflective front face;
  luminous radiation scattering and/or absorption means configured to scatter and/or absorb, directly, luminous radiation liable to be transmitted by a rear face, opposite the front face.

According to an embodiment, the scattering and/or absorption means are disposed facing and away from the rear face.

According to an embodiment, the scattering and/or absorption means comprise:
  a light-scattering layer, advantageously a metallic layer, or
  an absorption layer, advantageously the absorption layer for example a metallic layer, or
  a layer formed of carbon nanotubes, or
  a heat sink which comprises a solid material for example carbon, metal and optionally structured to dissipate heat, or
  an anti-reflective layer, advantageously disposed on means configured to dissipate heat.

According to an embodiment, the scattering means comprise a series of first collection strips, essentially flat or curved (enabling said first collection strips to be diverging), known as first strips, said first collection strips being each provided with a first front face and a first rear face opposite the first front face. These first strips are aligned along an alignment direction, parallel with one another, and oriented so as to partially reflect the luminous radiation liable to be transmitted by the rear face, toward a first dissipator (heat sink). The first strips may for example reflect the luminous radiation liable to be emitted by the rear face according to an angle of reflection either of approximately 45 degrees, or of approximately 90° to said luminous radiation, and toward the first dissipator.

The benefit of the dissipation means according to this embodiment is that of being able to dissipate the energy of the luminous radiation liable to be transmitted by the rear face at different points or different regions of the first dissipator. These means make it possible more particularly to "spread" the flow associated with the luminous radiation liable to be transmitted by the rear face.

It is moreover possible to adjust this spread by adjusting the spacing between the first strips. For example, the first strips may be increasingly tightened on moving away from the rear face.

Thus, if the intensity of the luminous radiation liable to be emitted by the rear face is $I_0$, the intensity actually received on the first front face of a first given collection strip is equal to $T^n \times I_0$, where T is the transmission coefficient of a first collection strip and n is the number of first collection strips preceding the first given collection strip on the path of the luminous radiation. Consequently, the adjustment of the spacing between first collection strips is a dependent on T (T is less than 1 for example equal to 0.9), $I_0$, but also dependent on the heat dissipation property of the at least one dissipator.

These first strips may be very transparent and have very low absorption. For example, the first strips may make it possible to reflect a few percent (for example 8%) of incident radiation and transmit some tens of percent (for example 92%). The first strips may comprise glass for example a B1664, or BK7 type glass. The invention is however not limited to these two examples.

According to an embodiment, the at least a first dissipator is disposed perpendicularly to the front face of the mirror.

According to an embodiment, the first collection strips are furthermore partially transparent such that the first front face of each thereof is exposed to the luminous radiation liable to be transmitted by the rear face and traversing the first collection strip preceding same on the path of the radiation.

According to an embodiment, the scattering means comprise a series of second collection strips, for example of the same type as the first collection strips, essentially flat or curved (enabling said first collection strips to be diverging), referred to as first strips, each provided with a second front face and a second rear face opposite the second front face, the second collection strips being aligned along an alignment direction, parallel with one another, and oriented so as to partially reflect, toward a second dissipator, the luminous radiation liable to be transmitted by the rear face.

According to an embodiment, the first collection strips and the second collection strips are disposed in alternation along the alignment direction.

It is possible according to the present invention to consider other series of collection strips, for example of the same type as the first collection strips. The collection strips within a series may also be aligned along an alignment direction, parallel with one another, and oriented so as to reflect partially, toward another dissipator. The first dissipator, the second dissipator as well as the other dissipators suitable for consideration may be disposed about the alignment direction (in other words, the direction of propagation of the luminous radiation from the rear face of the micromirror). For example, if three dissipators were to be considered, the normal thereof could be disposed angularly at 120° in relation to one another about the alignment axis. It is possible to generalize this concept to N dissipators disposed angularly at 360°/N about the alignment axis.

The device may also comprise at least a first diverging lens which is inserted between a first front face (of a first collection strip) and the first dissipator so as to spread the radiation reflected by said first face toward said first dissipator.

Equivalently, the device may also comprise at least a second diverging lens which is inserted between a second front face (of a second collection strip) and the second dissipator so as to spread the radiation reflected by said second face toward said second dissipator.

According to an embodiment, the first collection strips are disposed perpendicularly to the second collection strips.

According to an embodiment, the mirror comprises from the front face thereof to the rear face thereof, a partially reflective layer and a mechanical supporting base layer, said layers having, each, an absorption coefficient at the wavelength $\lambda$ less than 0.1%, advantageously nil.

According to an embodiment, the partially reflective layer comprises a Bragg stack, the Bragg stack comprising at least one elementary Bragg stack.

According to an embodiment, an elementary Bragg stack comprises a stack of two dielectric and/or semiconductor layers, advantageously an elementary Bragg stack comprises a layer of silicon dioxide and a layer of amorphous silicon.

According to an embodiment, the Bragg stack is limited to one or two elementary Bragg stacks.

The invention is however not limited to the use of one or two elementary Bragg stacks, and a greater number of stacks may be considered as long as the issue of mirror curvature is controlled.

According to an embodiment, the mechanical supporting base layer comprises a semiconductor material, advantageously silicon, even more advantageously monocrystalline silicon.

According to an embodiment, a so-called impedance matching layer is configured to limit internal reflections of the luminous radiation within the mirror.

According to an embodiment, said device is a LIDAR device.

BRIEF DESCRIPTION OF THE DRAWINGS

Further features and advantages will emerge in the following description of a reflector device according to the invention, given by way of non-limiting examples, with reference to the appended drawings wherein.

DETAILED DESCRIPTION OF PARTICULAR EMBODIMENTS

The present invention relates to a reflector device provided with a mirror (or micromirror) intended to reflect luminous radiation of higher mean and instantaneous optical powers than conventional micromirrors without being subjected to temperature rise that is noteworthy and/or liable to degrade the performances thereof, i.e. with higher laser damage thresholds than conventional micromirrors.

The present invention therefore uses a mirror having little or no absorption of luminous radiation, coupled with heat dissipation means of the luminous flux liable to be transmitted by this mirror.

Throughout the description and in the claims, the expression "light scattering" may be used indifferently to describe both scattering and absorption of luminous radiation, or indeed deflection of said radiation or indeed thermal dissipation.

The term "scatter" denotes the dispersion in several directions of luminous radiation.

The term "absorb" denotes the conversion of the energy carried by the luminous radiation into another form of energy in order to dissipate the latter.

The term "absorption coefficient" denotes the proportion of incident energy, carried by the luminous radiation, absorbed The term "reflection coefficient" denotes the proportion of incident energy, carried by the luminous radiation, reflected The term "transmission coefficient" denotes the proportion of incident energy, carried by the luminous radiation, transmitted The term "deflection" denotes the means configured to redirect the reflection of the radiation transmitted in another direction than a rear face of the mirror.

FIGS. 1 to 6 illustrate different embodiments of a reflector device 10 according to the present invention.

The reflector device 10 may comprise holding means 21, for example two posts 21*a* and 21*b*, intended to hold a partially transparent mirror 23 facing luminous radiation of a predetermined wavelength λ.

The term "partially transparent" denotes that a fraction of incident luminous radiation I on a front face 24 of the mirror is reflected by said face, whereas another fraction partially traverses the mirror, and emerges in the form of transmitted radiation T, via a rear face 25 opposite the front face 24.

The holding means 21*a* and 21*b* may particularly be arranged to enable pivoting of the mirror about one or two pivot axes.

The device also comprises scattering and/or absorption means 26 configured to scatter and/or absorb the transmitted radiation. The scattering and/or absorption means 26 particularly limit the reflection of the radiation toward the mirror 23.

In this regard, the scattering and/or absorption means 26 may be disposed facing and away from the rear face 25 of the mirror 23. In particular, the holding means 21 extend from scattering and/or absorption means 26.

Figure 1:
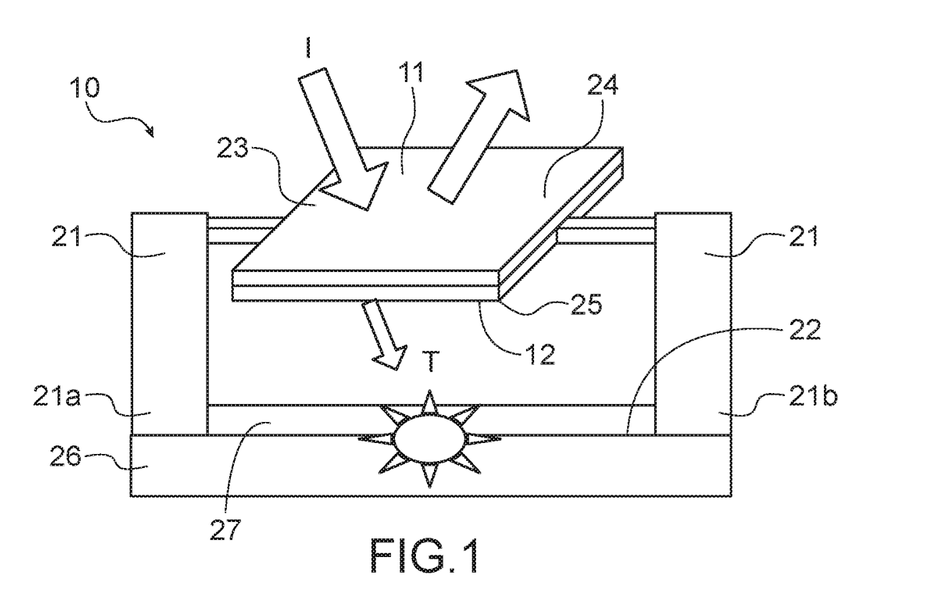
FIG. 1 is a schematic representation, according to a first embodiment of the present invention.

According to a first embodiment illustrated in FIG. 1, the scattering and/or absorption means 26 are arranged to absorb the transmitted radiation.

In this regard, the means 26 may comprise at least one absorbent layer 27 (or stack of absorbent layers), for example an absorbent metallic layer formed on a main face 22 of a supporting base 20 for example a silicon supporting base.

Alternatively, the absorbent layer may comprise a layer of a powder, particularly a layer of graphite powder. With regard to luminous radiation of wavelength of 1550 nm, a layer of graphite powder has little or no transmissivity, and also has a very low reflection coefficient (of the order of 0.5%).

Also alternatively, the means 26 may comprise, on a supporting substrate (for example a silicon supporting substrate), and from a face of this supporting substrate, a layer of titanium of 200 nm of thickness, a layer of silicon dioxide of 270 nm of thickness, a layer of titanium of 13 nm of thickness, and a layer of silicon dioxide of 250 nm of thickness. In this scenario, transmitted radiation of a wavelength equal to 1550 nm will be partially absorbed by the titanium layers, and very poorly reflected (the reflection coefficient is particularly less than 1%).

Figure 2:
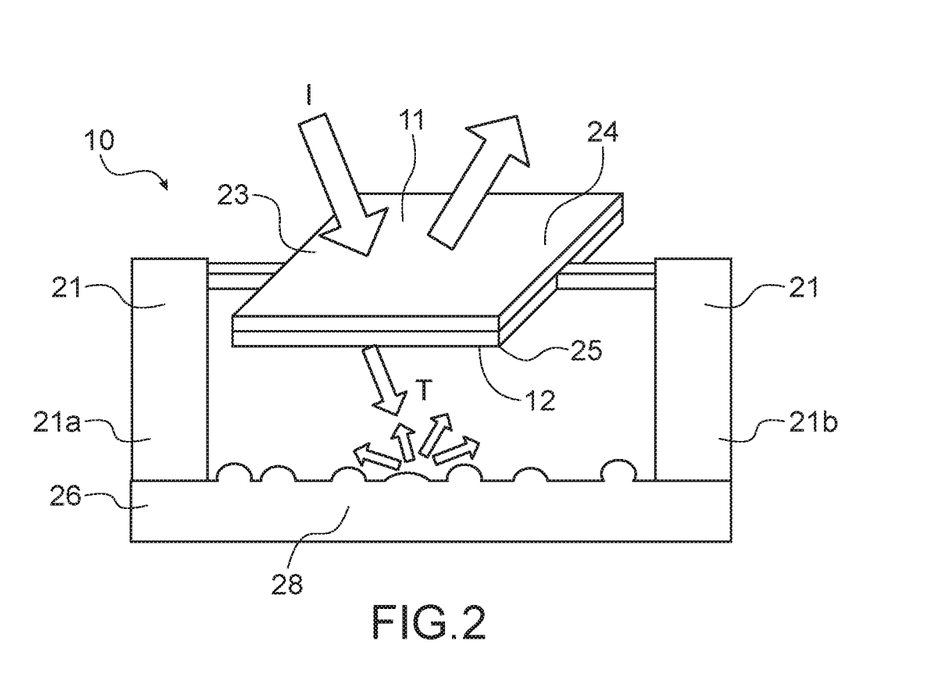
FIG. 2 is a schematic representation, according to a second embodiment of the present invention.

According to a second embodiment illustrated in FIG. 2, the scattering and/or absorption means 26 comprise an optionally metallic plate.

In particular, this plate comprises a face facing the rear face 25, and the surface whereof is textured 28 so as to distribute the transmitted radiation. The texturing of the surface may particularly comprise the creation of three-dimensional patterns, for example according to a range of spatial periods adjusted to scatter the luminous radiation of wavelength λ. In particular, the spatial periods in question may be slightly greater than the predetermined wavelength λ. In particular, if the predetermined wavelength is equal to 1550 nm, the spatial period of the texturing may be between 2 μm and 5 μm.

The scattering plate may comprise an aluminum plate (the face whereof facing the rear face 25 is textured).

The texturing may also be obtained by dispersing a powder of a chosen granulometry on a face of a supporting substrate.

Figure 3:
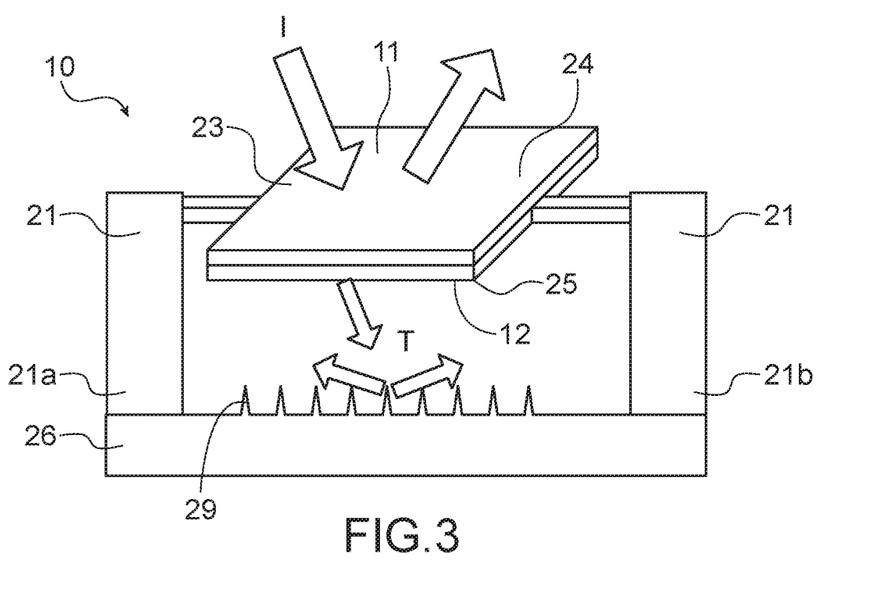
FIG. 3 is a schematic representation, according to a third embodiment of the present invention.

According to a third embodiment illustrated in FIG. 3, the scattering and/or absorption means 26 may comprise a reflective plate one face whereof has texturing 29, particularly faceted protruding shapes, intended to deflect the transmitted radiation along another direction than that of the mirror. The faceted protruding shapes may particularly comprise pyramids (for example with 3 or 4 facets).

Figure 4:
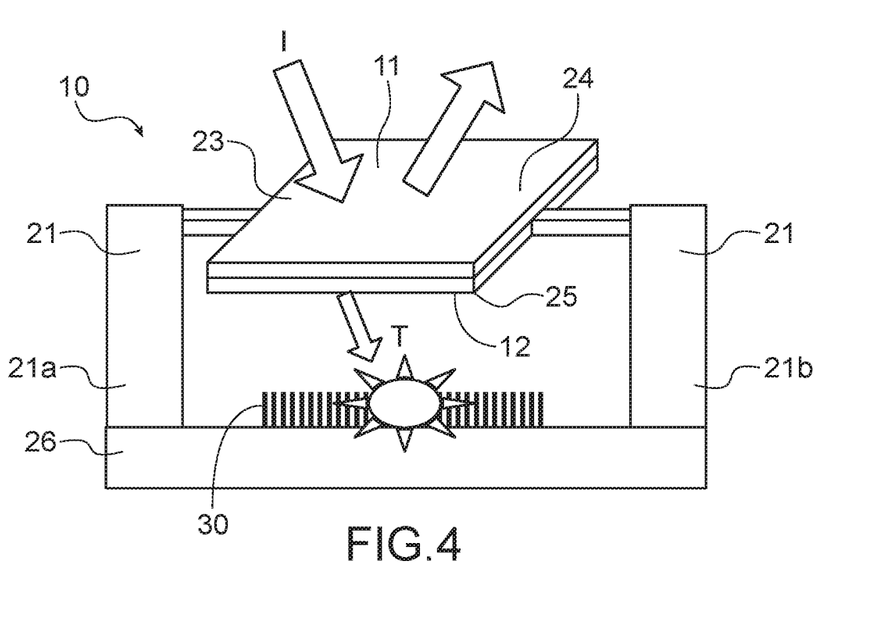
FIG. 4 is a schematic representation, according to a fourth embodiment of the present invention.

According to a fourth embodiment illustrated in FIG. 4, the scattering and/or absorption means 26 may comprise a layer of carbon nanotubes 30 formed on a supporting substrate, particularly a silicon substrate.

Figure 5:
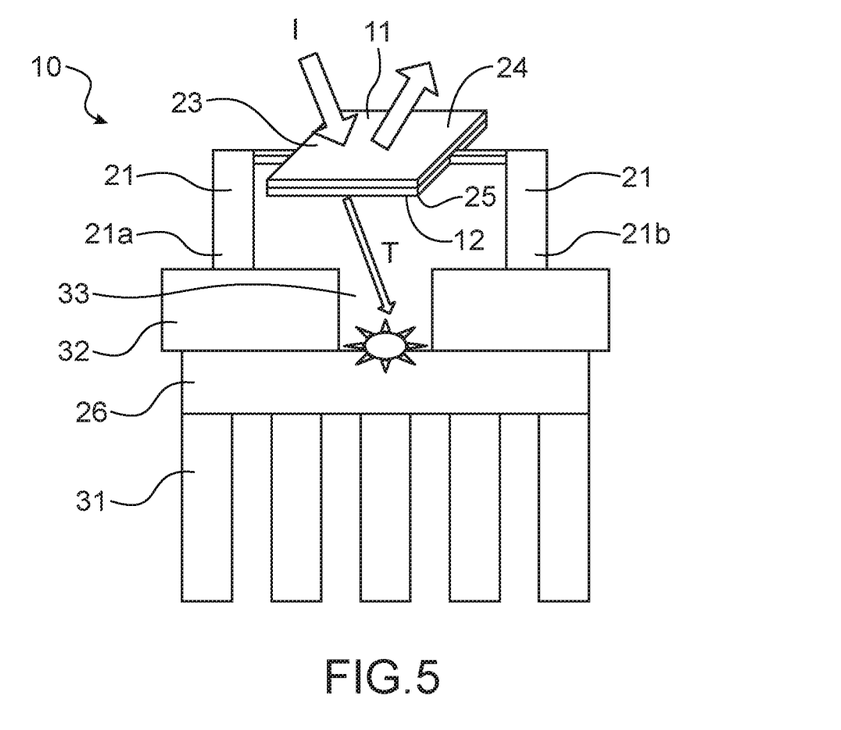
FIG. 5 is a schematic representation, according to a fifth embodiment of the present invention.

According to a fifth embodiment illustrated in FIG. 5, the scattering and/or absorption means 26 may comprise a heat sink 31, particularly a heat sink with fins made of anodized aluminum.

The heat sink 31 may, in particular, be coupled with the reflector device 10 via an intermediate supporting base 32.

The intermediate supporting base 32 may be provided with a recess 33 enabling the transmitted radiation to reach the heat sink 31

Figure 6:
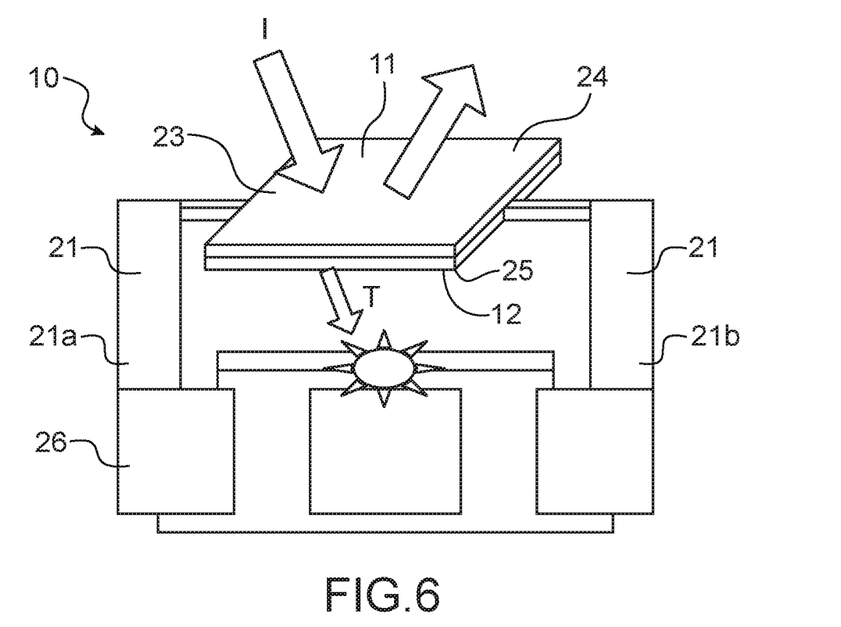
FIG. 6 is a schematic representation, according to a sixth embodiment of the present invention.

According to a sixth embodiment illustrated in FIG. 6, the scattering and/or absorption means 26 comprises a heat sink device whereon an anti-reflective layer is formed.

The heat sink may particularly use the features of the first or the fifth embodiment.

The anti-reflective layer may particularly be Aeroglaze Z-306®.

Figure 8:
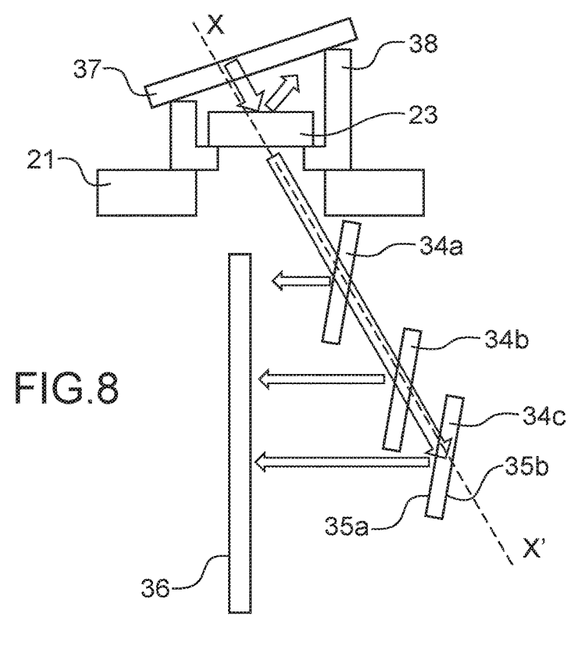
FIG. 8 is a schematic representation, according to a seventh embodiment of the present invention.

According to a seventh embodiment illustrated in FIG. 8, the scattering means 26 comprise a series of first collection strips 34*a*, 34*b*, 34*c*, essentially flat or curved, each provided with a first front face 35*a* and a first rear face 35*b* opposite the first front face 35*a*.

The first collection strips 34*a*, 34*b*, 34*c* are particularly aligned along an alignment direction XX', and parallel with one another. The latter are moreover oriented so as to partially reflect, toward a first dissipator 36 the luminous radiation liable to be transmitted by the rear face 25. The first dissipator 36 may for example be disposed perpendicularly to the front face 24 of the mirror 23. The first collection strips may be pivotally mounted.

Moreover, the first collection strips 34a, 34b, 34c furthermore be partially transparent such that the first front face 35a of each thereof is exposed to the luminous radiation liable to be transmitted by the rear face 25 and traversing the first collection strip preceding same on the path of the radiation.

These first strips may be very transparent and have very low absorption. For example, the first strips may make it possible to reflect a few percent (for example 8%) of incident radiation and transmit some tens of percent (for example 92%). The first strips may comprise glass for example a B1664, or BK7 type glass. The invention is however not limited to these two examples.

The mirror 23 may finally be topped with a transparent window 37 disposed on a base 38. The base 38 may have an opening intended to uncover the rear face of the mirror 23.

Thus, in operation, the luminous radiation liable to be transmitted by a rear face 25 successively traverses the first collection strips 34a, 34b and 34c. A portion of this radiation is nonetheless reflected by each of the first front faces 35b toward the dissipator screen 36. The use of several first collection strips according to this seventh embodiment thus makes it possible to distribute at different locations of the dissipator screen 36 the energy to be dissipated.

This distribution is moreover dependent on the spacing between the first collection strips. In this regard, the latter may have a decreasing spacing on moving away from the rear face.

The first collection strips 34a, 34b, and 34c may comprise a glass, for example BK7, or silicon coated with an elementary Bragg stack comprising a layer of silicon dioxide and a layer of amorphous silicon.

The first collection strips 34a, 34b, and 34c may have a square shape of sides measuring 5 mm by 5 mm. The first dissipator 36 may have a square shape for example of sides measuring 5 cm by 5 cm.

The first dissipator 36 may comprise a non-reflective absorbent layer, by a powder layer, particularly a graphite powder layer on a silicon supporting base.

The device may also comprise at least a first diverging lens which is inserted between a first front face (of a first collection strip) and the first dissipator so as to spread the radiation reflected by said first face toward said first dissipator.

Finally, the assembly formed by the first dissipator and the first collection strips may advantageously be dissociated from the micromirror and/or the supporting base thereof. This aspect particularly makes it possible to enhance the efficiency of the heat dissipation without risking reinjecting the latter by conduction at the level of the micromirror and/or the supporting base thereof.

Figure 9:
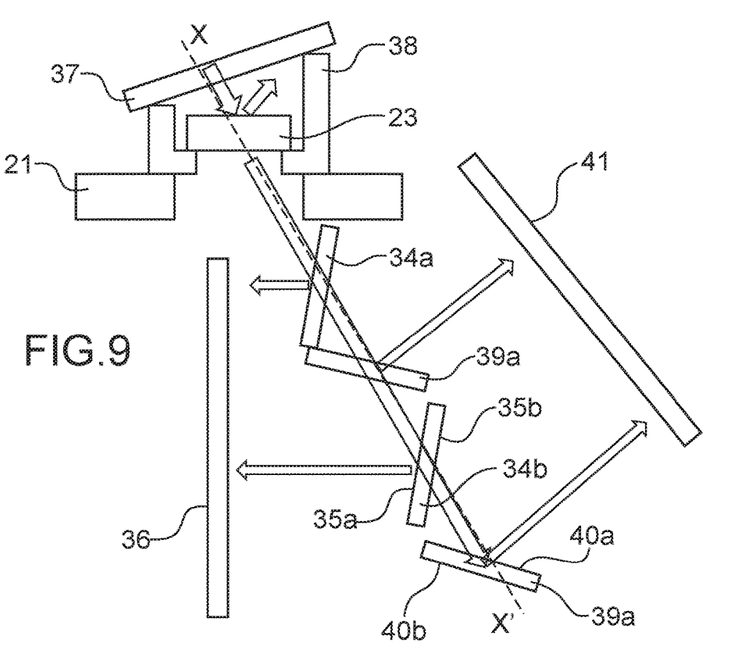
FIG. 9 is a schematic representation of an alternative embodiment of the seventh embodiment of the present invention.

FIG. 9 represents an alternative embodiment of this seventh embodiment.

According to this embodiment, the scattering means 26 comprise a series of second collection strips 39a and 39b, essentially flat, each provided with a second front face 40a and a second rear face 40b opposite the second front face. The second collection strips 39a and 39b are moreover aligned along the alignment direction XX', parallel with one another, and oriented so as to partially reflect, toward a second dissipator 41, the light radiation liable to be transmitted by the rear face (25).

Also according to an embodiment, the first collection strips 34a, 34b and the second collection strips 39a, 39b are disposed in alternation along the alignment direction. The first collection strips may for example be perpendicular to the second collection strips.

Moreover, the first collection strips and the second collection strips may comprise the same material.

Equivalently, the first dissipator screen and the second dissipator screen may comprise the same material.

The device may also comprise at least a second diverging lens which is inserted between a second front face (of a second collection strip) and the second dissipator so as to spread the radiation reflected by said second face toward said second dissipator.

It is possible according to the present invention to consider other series of collection strips, for example of the same type as the first collection strips. The collection strips within a series may also be aligned along an alignment direction, parallel with one another, and oriented so as to reflect partially, toward another dissipator. The first dissipator, the second dissipator as well as the other dissipators suitable for consideration may be disposed about the alignment direction (in other words, the direction of propagation of the luminous radiation from the rear face of the micromirror). For example, if three dissipators were to be considered, the normal thereof could be disposed angularly at 120° in relation to one another about the alignment axis. It is possible to generalize this concept to N dissipators disposed angularly at 360°/N about the alignment axis.

Regardless of the embodiment considered, the coupling of the scattering and/or absorption means 26 with the holding means 21a and 21b may be carried out by bonding.

In particular, the bonding may be performed by means of an adhesive, or comprise metal/metal bonding or molecular bonding.

The mirror 23 may comprise from the front face thereof to the rear face thereof, a partially reflective layer 11 and a mechanical supporting base layer 12, said layers having, each, a negligible absorption coefficient at the wavelength $\lambda$, advantageously nil.

According to a particularly advantageous alternative embodiment, the partially reflective layer 11 may comprise a Bragg stack (or Bragg mirror), the Bragg stack comprising at least one elementary Bragg stack.

The term "Bragg stack" denotes a periodic succession of transparent, or partially transparent, layers, of different refractive indexes.

An elementary Bragg stack comprises a stack of two dielectric and/or semiconductor layers.

In particular, once the radiation is in the infrared range, and more particularly of wavelength equal to 1550 nm in normal incidence, the elementary Bragg stack may comprise a layer of silicon dioxide of a thickness of 305 nm (the refractive index whereof at 1550 nm equals 1.44) coated with a layer of amorphous silicon of a thickness of 110 nm (the refractive index whereof at 1550 nm equals 3.42).

According to this configuration, a Bragg stack merely comprising a single elementary Bragg stack, will have, for an incidence of 20°, a reflection coefficient equal to 82.4% and a transmission coefficient equal to 17.6% when faced with luminous radiation of wavelength equal to 1550 nm. For an incidence of 45°, the reflection coefficient is 80.9% and the transmission coefficient is 19.1%. This stack will moreover not be absorbent and have quasi-nil overheating.

Also according to this configuration, a Bragg stack comprising two elementary Bragg stacks, will have, for a radiation incidence of 45°, a reflection coefficient equal to 96.4% and a transmission coefficient equal to 3.6% when faced with luminous radiation of wavelength equal to 1550 nm. This stack will moreover have little or no absorption and have quasi-nil overheating.

The stacks cited above, as well as any other stack suitable for being used within the scope of the present invention, may be formed on a mechanical supporting base layer made for example of a semiconductor or dielectric material.

The choice of the material may, for example, be imposed by the wavelength λ. By way of example, the absorption coefficient of a mechanical supporting base layer is negligible, or even nil, for wavelengths greater than 1250 nm. In other words, a mechanical supporting base layer made of monocrystalline silicon and of a thickness particularly between 20 μm and 100 μm, will be subjected to non-damaging overheating for the mirror.

Limiting the number of elementary Bragg stacks makes it possible to reduce the mechanical stress applied to the mirror, and thus prevent any deformation (for example curvature) of said mirror.

Moreover, combining such a mirror with dissipation and/or absorption means also makes it possible to limit, or even prevent, overheating of said mirror when high-power luminous radiation, particularly infrared radiation, is used.

Advantageously, the mechanical supporting base layer may comprise a semiconductor material, advantageously silicon, even more advantageously monocrystalline silicon.

The formation of a so-called impedance matching layer, configured to limit internal reflections of the luminous radiation within the mirror, may also be considered.

The impedance matching layer may particularly comprise silicon nitride when the supporting base is made of silicon.

FIGS. 7a to 7h illustrate an example of a method for manufacturing the mirror 10.

The method particularly comprises a step a) (FIG. 7a) of providing a silicon-on-insulator substrate 100 ("SOI"), comprising a layer of monocrystalline silicon covering a layer of silicon dioxide formed on a monocrystalline silicon substrate.

Figure 7A:
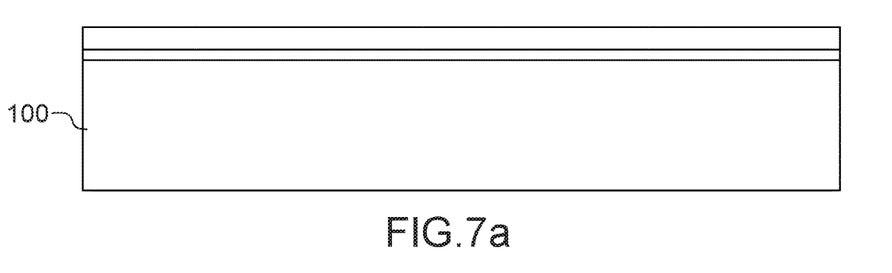
FIGS. 7a to 7g are schematic representations of an example of a method for manufacturing a mirror

Alternatively, step a) may comprise providing a solid substrate (for example a silicon substrate) on one face whereof a layer of silicon dioxide and a layer of polycrystalline silicon are successively formed.

Step a) is followed by a step b) which comprises the formation of a Bragg stack 110 (FIG. 7b) on the silicon layer of the SOI substrate. The stack 110 particularly comprises a Bragg stack.

Figure 7B:
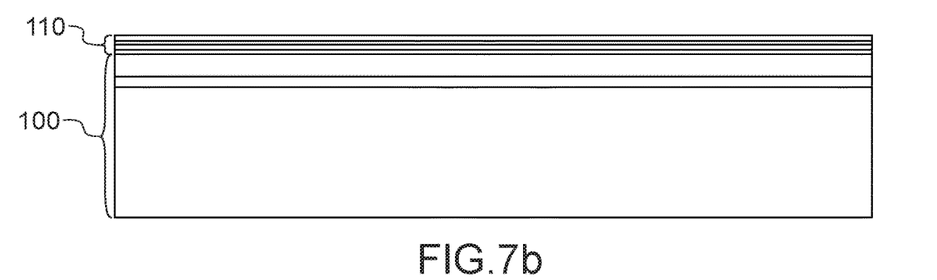

The Bragg stack represented in this figure particularly comprises two elementary Bragg stacks each made of a layer of silicon dioxide, of 305 nm of thickness, and of amorphous silicon, of 110 nm of thickness.

Figure 7C:
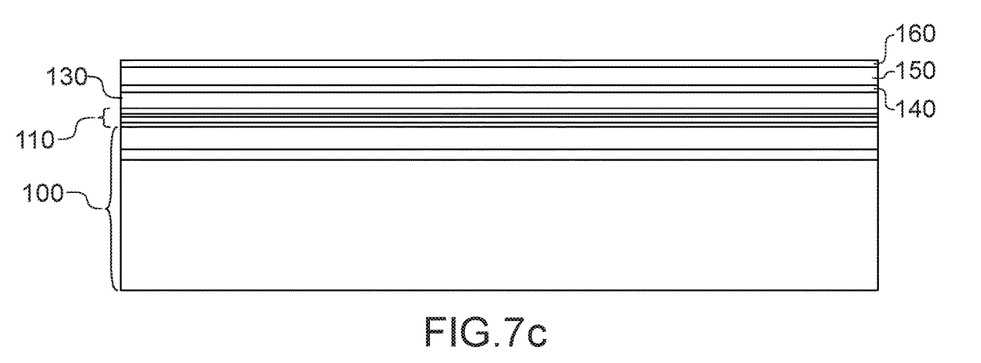

Step b) is followed by a step c) of forming, and in the following order, a protective layer 130, a lower electrode 140, a layer of PZT 150, and an upper electrode 160 (FIG. 7c).

Figure 7D:
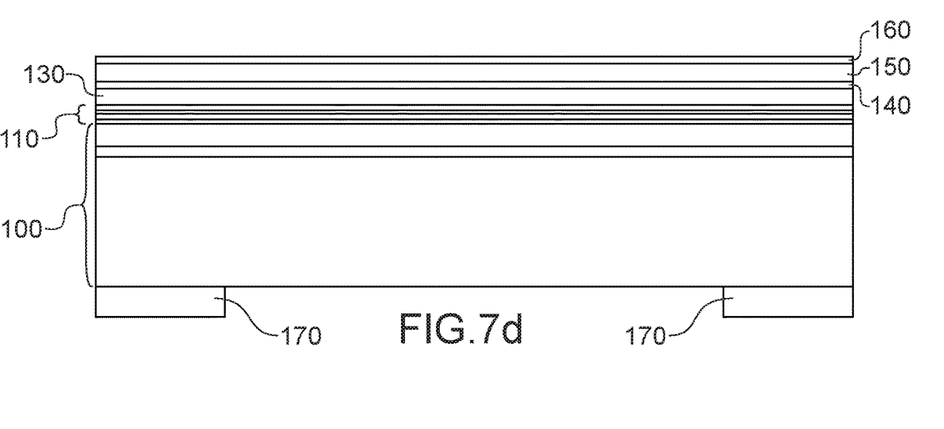

A step d) of forming a hard mask 170 is then carried out (FIG. 7d). This hard mask 170, which may particularly comprise silicon dioxide, is intended to enable the release of the mirror by etching from a rear face of the SOI substrate.

Figure 7E:
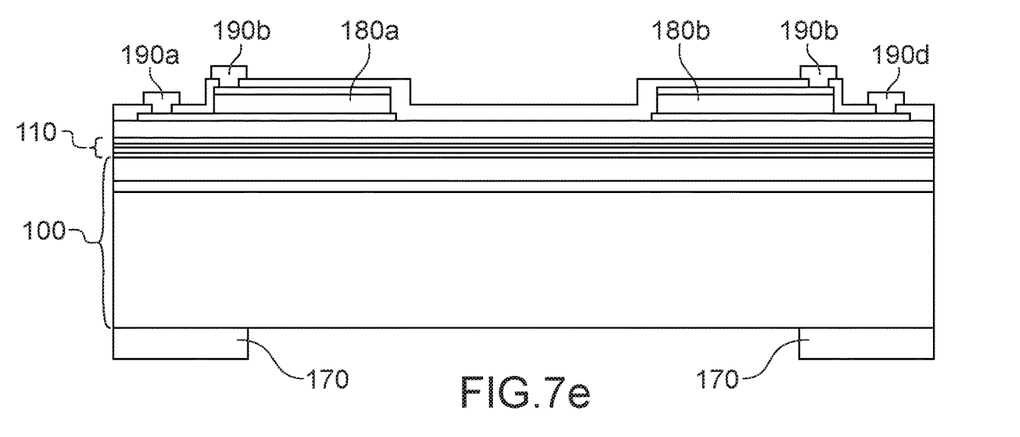

Electrode patterns 180a and 180b, as well as contacts 190a, 190b, 190c and 190d are formed during a step e) illustrated in FIG. 7e.

Figure 7F:
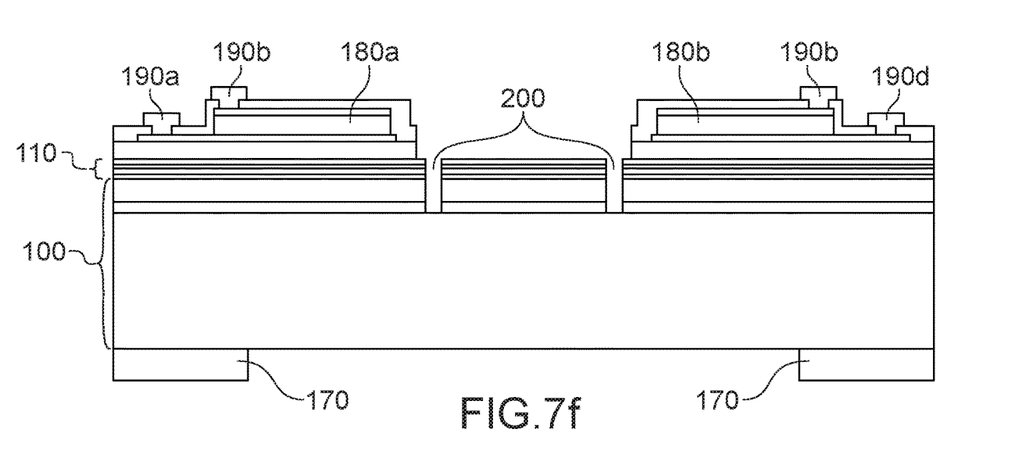

The pattern of the mirror is together defined by producing cuts 200 via a front face, extending up to the supporting base of the SOI substrate (FIG. 7f).

Figure 7G:
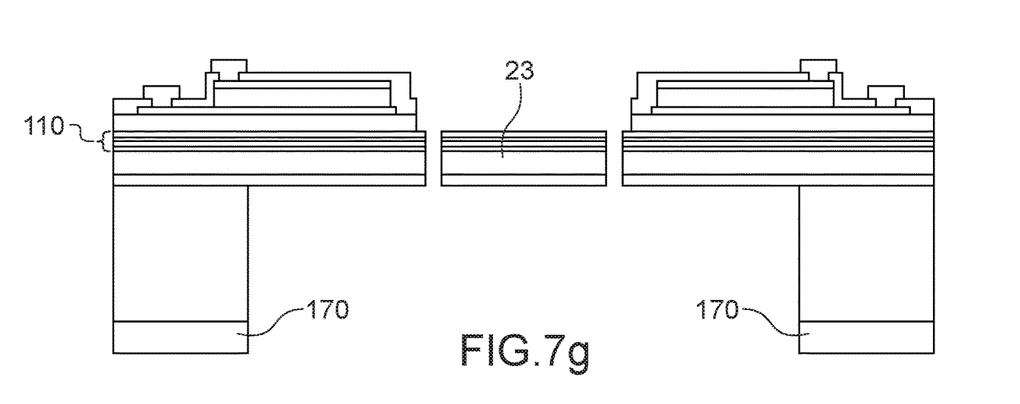

Finally, as illustrated in FIG. 7g, etching via the rear face of the supporting base of the SOI substrate is carried out to release the mirror.

The invention is not limited to a mirror produced according to the method described above.

REFERENCES

[1] Harald Schenk et al., "Micro Mirrors for High-speed Laser Deflection and Patterning", Physics Procedia, 56 (2014) 7-18.

The invention claimed is:

1. A reflector device configured to reflect incident luminous radiation of wavelength λ, the device comprising a supporting base whereon are assembled:
   a partially transparent mirror, having a partially reflective front face that reflects a fraction of the incident luminous radiation on the front face;
   luminous radiation scattering means configured to scatter luminous transmitted radiation that traverses through the partially transparent mirror and emerges via a rear face of the partially transparent mirror, the rear face being opposite the front face; and
   holding means for holding the partially transparent mirror, wherein the holding means enable the partially transparent mirror to be pivoted about at least one axis,
   wherein the wavelength λ is higher than 1250 nm,
   wherein said device is a Light Detection And Ranging device,
   wherein the partially transparent mirror has a reflection coefficient of the incident luminous radiation of at least 96%,
   wherein the scattering means are disposed facing and away from the rear face, and
   wherein the scattering means comprise a series of first collection strips, essentially flat, each provided with a first front face and a first rear face opposite the first front face, the first collection strips being aligned along an alignment direction, parallel with one another, and oriented so as to partially reflect, toward a first dissipator, the transmitted luminous radiation liable to be transmitted by the rear face.

2. The device according to claim 1, wherein the first dissipator is disposed perpendicularly to the front face of the partially transparent mirror.

3. The device according to claim 1, wherein the first collection strips are furthermore partially transparent such that the first front face of each thereof is exposed to the transmitted luminous radiation liable to be transmitted by the rear face and traversing the first collection strip preceding same on the path of the transmitted luminous radiation.

4. The device according to claim 1, wherein the scattering means comprise a series of second collection strips, essentially flat, each provided with a second front face and a second rear face opposite the second front face, the second collection strips being aligned along the alignment direction, parallel with one another, and oriented so as to partially reflect, toward a second dissipator, the transmitted luminous radiation liable to be transmitted by the rear face.

5. The device according to claim 4, wherein the first collection strips and the second collection strips are disposed in alternation along the alignment direction.

6. The device according to claim 5, wherein the first collection strips are disposed perpendicularly to the second collection strips.

7. The device according to claim 1, wherein the partially transparent mirror comprises from the front face thereof to the rear face thereof, a partially reflective layer and a mechanical supporting base layer, said layers having, each, an absorption coefficient at the wavelength λ less than 0.1%.

8. The device according to claim 7, wherein the partially reflective layer comprises a Bragg stack, the Bragg stack comprising at least one elementary Bragg stack.

9. The device according to claim 8, wherein the Bragg stack is limited to one or two elementary Bragg stacks.

10. The device according to claim 7, wherein the mechanical supporting base layer comprises a semiconductor material.

11. The device according to claim 1, wherein an impedance matching layer is configured to limit internal reflections of the transmitted luminous radiation within the partially transparent mirror.

12. The device according to claim 1, wherein the wavelength $\lambda$ is 1550 nm.

13. The device according to claim 1, wherein the holding means include two posts.

14. A reflector device intended to reflect luminous radiation of wavelength $\lambda$, the device comprising a supporting base whereon are assembled:
- a partially transparent mirror, having a partially reflective front face; and
- luminous radiation scattering means configured to scatter, directly, luminous radiation liable to be transmitted by a rear face, opposite the front face,
- wherein the scattering means comprise a series of first collection strips, essentially flat, each provided with a first front face and a first rear face opposite the first front face, the first collection strips being aligned along an alignment direction, parallel with one another, and oriented so as to partially reflect, toward a first dissipator, the transmitted luminous radiation liable to be transmitted by the rear face.

15. The device according to claim 14, wherein the first dissipator is disposed perpendicularly to the front face of the partially transparent mirror.

16. The device according to claim 14, wherein the first collection strips are furthermore partially transparent such that the first front face of each thereof is exposed to the transmitted luminous radiation liable to be transmitted by the rear face and traversing the first collection strip preceding same on the path of the transmitted luminous radiation.

17. The device according to claim 14, wherein the scattering means comprise a series of second collection strips, essentially flat, each provided with a second front face and a second rear face opposite the second front face, the second collection strips being aligned along the alignment direction, parallel with one another, and oriented so as to partially reflect, toward a second dissipator, the transmitted luminous radiation liable to be transmitted by the rear face.

* * * * *